Oct. 28, 1947. C. S. KELLEY 2,429,693
SLACK ADJUSTER
Filed Dec. 12, 1945
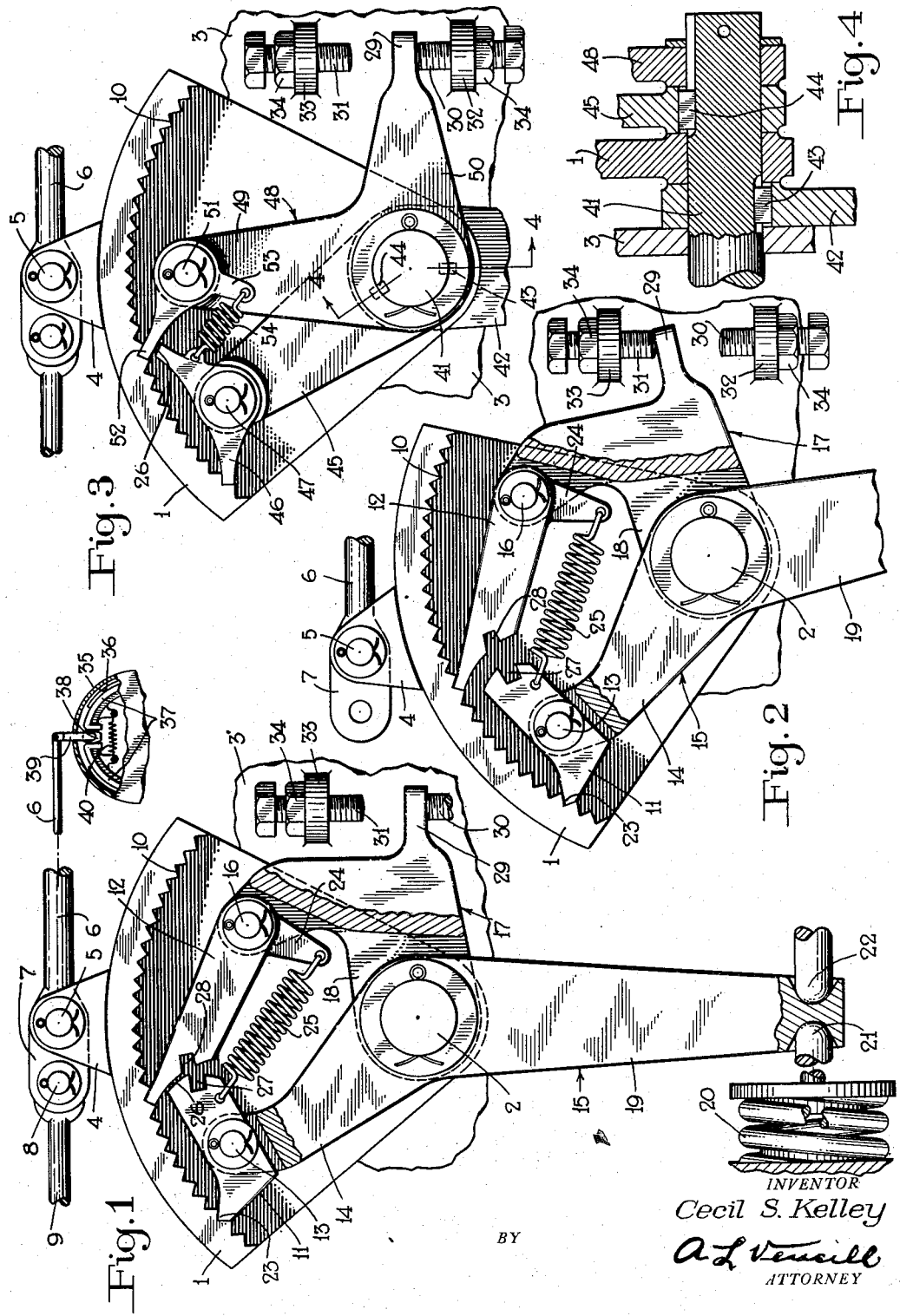
INVENTOR
Cecil S. Kelley
BY
A. L. Vencill
ATTORNEY Patented Oct. 28, 1947

2,429,693

UNITED STATES PATENT OFFICE 2,429,693

SLACK ADJUSTER

Cecil S. Kelley, Forest Hills, Pa., assignor to The Westinghouse Air Brake Company, Wilmerding, Pa., a corporation of Pennsylvania Application December 12, 1945, Serial No. 634,493

7 Claims. (Cl. 188—196)

This invention relates to automatic slack adjusters and more particularly to a slack adjuster adapted for use in vehicle brake rigging.

An object of the invention is to provide a combined brake lever and slack adjuster mechanism which will function as a brake lever so long as there is no undue slack in the brake rigging, and which will function to take up slack, when due to wear of the brake shoes or brake lining, the slack becomes excessive.

A well known type of brake employed on vehicles comprises a drum having an internal braking surface, brake shoes or a brake band adapted to engage the braking surface of the drum and a cam adapted upon rotation to expand the brake shoes or brake band so as to frictionally engage the braking surface of the drum.

In this type of brake as the brake shoes or brake band wear away, a further rotative movement of the cam is required in order to secure braking action. The combined brake lever and slack adjuster constituting the present invention is designed to first actuate a pull rod which in turn actuates a lever to rotate the cam to effect the desired braking. If due to wear of the brake shoes or brake band the above mentioned further rotative movement of the cam is required the combined brake lever and slack adjuster will compensate for such movement by adjusting the cam so that the required clearance space between the friction braking surface of the drum and brake shoes or brake band is maintained regardless of the amount of wear of the brake shoes or brake band.

Other objects and advantages will be apparent from the following more detailed description of the invention.

In the accompanying drawing, Fig. 1 is a face view of a combined brake lever and slack adjuster mechanism designed in accordance with the invention, the mechanism being shown in its brake release position; Fig. 2 is a similar face view, showing the combined brake lever and slack adjuster mechanism in one of its slack take-up stages; Fig. 3 is a face view similar to the view of Fig. 1 of another form of the invention; and Fig. 4 is a fragmentary sectional view taken on the line 4—4 of Fig. 3.

The combined brake lever and slack adjuster mechanism illustrated in Fig. 1 comprises an arm 1 which is rockably mounted on a member 2 rigidly carried by a fixed member 3. This arm extends radially outward from the member 2 and is made in the form of a segment of a circle. Extending outwardly from the peripheral surface of the arm and preferably integral with the arm is an extension in the form of a lug 4. Operatively connected to this lug, by means of a pin 5, is a pull rod 6 which is operative by the arm 1 to effect an application of the brakes as will hereinafter more fully appear.

The pull rod 6 is provided with an extension 7 to which is operatively attached, by means of a pin 8, a hand brake pull rod 9 whereby the pull rod 6 and thereby the arm 1 may be actuated to effect an application of the brakes.

The arm 1 is provided with a plurality of internal teeth 10 which are engaged by pawls 11 and 12, the pawl 11 being rockably carried by a pin 13 carried by an arm 14 of a lever 15 which is rockably mounted between its ends on the member 2, and the pawl 12 being rockably mounted on a pin 16 carried by a measuring element 17 having spaced flanges 18 which are disposed one on each side of the lever 15 and which are rockably mounted on the member 2. The pin 16 is spaced radially from the member 2 and extends between and is secured to the flanges 18. It should here be mentioned that as shown one of the flanges 18 is broken away to facilitate a clear showing of other parts of the mechanism. It will, however, be understood that both flanges are identical in shape.

The lever 15 also has an operating arm 19 which, as shown, is subjected on one side to the power of a brake applying spring 20 transmitted to the lever through the medium of a plunger 21 and is subjected on the other side to an opposing power transmitted to the lever through the medium of a plunger 21 and is subjected on the other side to an opposing power transmitted to the lever through the medium of a plunger 22. The means for creating this opposing power may be in the form of an electro-magnet, of the solenoid type, not shown. The plunger 22 may be an integral portion of the movable core of the solenoid or may be a separate member actuated by the solenoid core.

The pawl 11 extends on each side of the pin 13 and, at its left-hand end as viewed in Fig. 1, is provided with an outwardly extending tooth 23 which is adapted to engage any selected one of the teeth 10 on the arm 1. With tooth 23 in operative engagement with a tooth 10 the pawl 11 constitutes the driving element from the actuating arm 14 of lever 15 to the driven arm 1.

The pawl 12 is disposed at an angle to the pawl 11 and at its outer end engages one of the teeth 10 of the arm, the tooth engaged being spaced away from the tooth which is engaged by the pawl 11. Adjacent its inner end the pawl is provided with an arm 24 which extends in the direction toward the member 2.

Interposed between the outer end of the arm 24 and the right-hand end of the pawl 11 and secured to the arm and said end of the pawl is a spring 25 which is so conditioned as to at all times exert a sufficient pulling force on the arm 24 and end of the pawl to maintain both pawls in engagement with the teeth 10 of the arm 1 against accidental disengagement.

Between the extreme right-hand edge of the pawl 11 and the adjacent edge of the pawl 12 there is a slight clearance space which is indicated by the reference numeral 26, the width of the space being such that when the end edge of the pawl 11 engages the adjacent edge surface of the pawl 12, under certain brake releasing conditions which will hereinafter be described, the tooth 23 will not be permitted to ratchet over a tooth 10 of the arm 1.

The right-hand end of the pawl 11 is provided with an open ended slot 27 and opposite this slot the pawl 12 is provided with a similar notch 28, the notches being so arranged as to accommodate the end of a screw-driver or any other suitable tool which may be axially rotated for moving both pawls out of engagement with the teeth 10 as will be later described.

The measuring element 17 is provided at its right-hand end with a measuring lug 29 which extends outwardly into the space between stops 30 and 31 which may be formed integral with the fixed member 3 or may comprise separate screw-threaded members as shown having screw-threaded connection with lugs 32 and 33, respectively. These screw-threaded members may be rotated to vary the width of the space for purposes which will be made clear in the following description of the operation of the mechanism. Each of the screw-threaded members is adapted to be locked in its adjusted position by means of a check nut 34.

In Fig. 1 the type of drum brake hereinbefore mentioned has been illustrated. This type of brake comprises a brake drum 35 having an internal braking surface which is adapted to be frictionally engaged by a brake lining 36 carried by a set of internal expanding brake shoes 37. These brake shoes are actuated by a rotatable cam 38 having attached thereto operating lever 39 which is operatively connected to the pull rod 6. Stretching between and operatively connected to both brake shoes is the usual release spring 40. It will here be understood that while the present invention has been described in connection with one type of drum brake having internal expanding brake shoes it may be employed with any other type of brake whether it be a drum brake or not.

While the present invention has been shown in connection with a spring applied electrically released brake, the invention is not limited to this use for it will be apparent that the arm 19 may be actuated by the usual air brake cylinder or any other power device.

*Operation*

Assuming that the several parts of the mechanism are in their brake release position as shown in Fig. 1 and it is desired to effect an application of the brakes, the operator operates his control device to reduce the degree of energization of the solenoid to any desired degree thus reducing the power exerted on the arm 19 of the lever 15 through the plunger 22.

Upon thus reducing the power of the solenoid the spring 20 acts to move the arm 19 in the direction toward the right hand and since the lever 15 is rockably mounted on the pin 2, the arm 14, acting through the medium of the pawl 11 whose tooth 23 is in engagement with a tooth 10 of the arm 1, rocks the arm 1 in a counter-clockwise direction and exerts a pull on the pull rod 6. This causes the cam 38 to rotate, spreading the shoes 37 and thereby the brake lining 36 to frictionally engage the inner surface of the brake drum 35.

The arm 1, as it is thus moved, acts through the pawl 12 to move the measuring element 17 in the same direction, the spring 25 acting to prevent relative movement between the arm 1 and the pawl 12 and thereby the measuring element 17.

In effecting an application of the brakes the lug 29 of the measuring element will engage the stop 31 and due to such engagement will be prevented from moving further as a unit with the arm 1 in the brake applying direction. If, while the brakes are applied, the brake lining 36 wears away, the arm 1 will be moved forward by the lever 15 acting through the medium of the pawl 11. Since the measuring member can no longer move with the arm 1, the arm will move relative to the measuring element and as a result the pawl 12 will engage the tooth 10 immediately back of the tooth which it formerly engages as shown in Fig. 2.

Now when it is desired to release the brakes, the power transmitted to the arm 19 of the lever 15 through the plunger 22 is increased causing the arm to move in a clockwise direction and compress the spring 20. The pull rod 6 which is of course under tension will tend to move the arm 1 in a clockwise or brake release position, so that when the lever 15 is moved the pawl 11 will also function to drive the arm 1 to its brake release position, the power of the spring 25 being sufficient to prevent the pawl from moving out of engagement with the tooth with which it is in engagement.

The arm 1 as it is being moved in this direction acts through the pawl 12 to move the measuring element 17 in the same direction until such time as the lug 29 engages the stop 30. When this occurs the pawl 12 will positively stop the movement of the arm 1. The lever 15 will however continue to move in the clockwise direction relative to the now stationary arm 1 and ratchet the tooth 23 into engagement with the tooth next to the one it is shown in engagement with in Figs. 1 and 2. Following this adjustment, the right-hand edge of the pawl 11 engages the adjacent edge of the pawl 12, and since the pawl 12 cannot now be moved such engagement will bring the pawl 11 and the lever 15 to a stop. It will here be understood that when the pawl 11 engages the pawl 12 as just described the tooth 23 will not ratchet to the next tooth 10, although it will move in this direction a distance equal to the width of the space 26.

If the force exerted by the pull rod 6 in releasing a brake application is not sufficient to rock the arm 1 from the position to which it has been moved on account of the wearing away of the brake lining, the pawl 11 will ratchet to the next tooth 10 to the right of the one it is shown in engagement with, and the right-hand end of the pawl 11 will, under the influence of the power exerted on the arm 19 of the level 15, engage the adjacent edge of the pawl 12 and through the medium of the pawl 12 actuate the arm 1 to its release position, the engagement of the pawl 12 by the pawl 11 positively preventing the pawl 12 from moving out of its adjusted position.

It will be apparent that when the interengaging friction braking surfaces of the brake wear away the combined lever and slack adjuster mechanism will operate automatically to position the arm 1 and thereby the cam and brake lining of the drum brake to compensate for such wear. By thus positioning the arm 1, the arm 19 of the lever 15 will always return to the brake release position in which it is shown in Fig. 1 and the clearance space between the brake lining and the interior braking surface of the brake drum after each release of the brake will be substantially the same.

When worn brake lining or brake shoes are replaced by new lining or shoes the arm 1 must be returned to a position to compensate for the greater thickness of the new lining or shoes. To accomplish this the pull rod 6 is disconnected from the lug 4 of the arm 1 by the removal of the pin 5. The solenoid will be deenergized so that the spring 20 moves the lever 15 and measuring element 17 and the associated pawls 11 and 12 to their brake applying position in which the lug 29 on the measuring element engages the stop 31 as shown in Fig. 2.

A screw-driver or other suitable tool is now inserted in the slots 27 and 28 of the pawls 11 and 12, respectively, and rotated axially, the screw-driver as it is thus rotated causing the pawl 11 to rock in a counter-clockwise direction about the pin 13 so that the tooth 23 of pawl 11 is moved free of the teeth 10. At substantially the same time as the pawl 11 is thus rocked, the screw-driver forces the pawl 12 back out of the path of travel of the teeth 10, such movement being yieldingly opposed by the spring 25, and being unopposed by the measuring element 17 since this element is free to rock in a clockwise direction about the pin 2.

When the pawls 11 and 12 are thus held out of the path of travel of the teeth 10, the arm 1 is rocked in a clockwise direction about the pin 2 relative to the pawls to the proper adjusted position, the position of the arm 1 with relation to the pawls 11 and 12 may be as shown in Fig. 1. With the arm 1 thus positioned the screw-driver is removed, whereupon both pawls, due to the force of the spring 25, will be moved into engagement with the teeth 10 of the arm 1. The solenoid may now be energized so as to move the lever 15 and thereby the arm 1 and measuring element 17 to brake release position against the opposing pressure of the brake applying spring 20. With the arm 1 in its brake release position the pull rod 6 is again attached to the lug 4 by means of the pin 5.

The mechanism being thus adjusted is now in condition for operation to control braking and to take up slack in the manner hereinbefore described.

Description of the apparatus of Figs. 3 and 4:

In this form of the invention the arm 1 which may be identical with the arm 1 shown in Fig. 1 is rockably mounted on a driven rotatable shaft 41 which is suitably journaled in the fixed member 3 as shown in Fig. 4.

For the purpose of rotating the shaft 41 an arm 42 is provided which is secured to the shaft by means of a key 43. The end of this arm may be subject to the opposing forces of a brake applying spring 20 and a solenoid operated plunger 22 in the same manner as the arm 19 of the lever 15 of the form of the invention shown in Fig. 1.

There is secured to the shaft 41 by means of a key 44 an arm 45, the outer end of which carries a pawl 46 rockably mounted on a pin or trunnion 47 carried by the arm.

Rockably mounted on the shaft 41 is a measuring element 48 which is in the form of a bellcrank having arms 49 and 50 which extend radially outwardly with relation to the shaft and which are shown disposed at right angles to each other.

The outer end of the arm 49 is provided with a pin or trunnion 51 on which a pawl 52 is rockably mounted. The outer end of arm 50 is provided with a measuring lug 29 for engagement with the stops 30 and 31 which are carried by the stationary member 3.

The left-hand end of the pawl 46, as viewed in Fig. 3, engages a tooth 10 of the arm 1 and forms a driving connection from the arm 45 to the arm 1. Adjacent the right-hand end of the pawl 46 the pawl 52 engages a tooth 10 of the arm 1, there being a slight clearance space 26 between the pawls, the purpose of which clearance space corresponds to that of the clearance space 26 in the mechanism shown in Fig. 1.

It should here be mentioned that the pawls 46 and 52 are both disposed in the same vertical plane so that the pawl 46 can engage the pawl 52 when the arm 1 is being moved to brake release position, the arm 49 being shaped at its outer end to provide this relationship between the pawls.

Interposed between and secured to the right-hand end of the pawl 46 and a lug 53 of the pawl 52 is a spring 54 which acts to yieldably maintain both pawls in engagement with the respective teeth 10 of the arm 1.

When the shaft 41 is rotated to effect an application of the brakes, the arm 45 acting through the medium of the pawl 46 and a tooth 10 of the arm 1, causes the arm 1 to rock in a counter-clockwise direction. Since the right-hand end of pawl 46 will prevent the pawl 52 from moving out of the path of the teeth 10 of the arm 1, the bellcrank measuring element will rock with the arm 1 until such time as the measuring lug 29 engages the stop 31. By reason of such engagement the measuring element is brought to a positive stop after which, wear of the brake lining or brake shoes occurs, the several parts of the mechanism will function to take-up the slack caused by such wear in exactly the same manner as the mechanism shown in Figs. 1 and 2.

To adjust this mechanism when worn brake lining or shoes are replaced by new lining or shoes the pawls may be held out of the path of travel of the teeth 10 by hand. However the pawls may be so constructed that screw-driven receiving slots may be provided therein.

From the foregoing description it will be apparent that both forms of the invention will operate in substantially the same manner to effect an application and release of the brakes and also to automatically take-up slack in the brake mechanism as such slack occurs due to wear of the brake lining or brake shoes or for any other reason.

Having now described my invention, what I claim as new and desire to secure by Letters Patent, is:

1. In a combined brake lever and slack take-up mechanism, a driven brake controlling arm having means for attachment with a brake rigging to be actuated, said arm being rockable in one direction to actuate the brake rigging to effect an application of the brake and being rockable in the opposite direction in releasing the brake, ratchet teeth carried by said arm, a driving arm, a driving pawl pivotally carried by said driving arm and having a driving connection with one of said ratchet teeth, a measuring element rockable between two spaced apart fixed stops, said element when in its brake released position engaging with one stop and being adapted to engage with the other stop when an application of the brake is being effected, a locking pawl pivotally carried by said measuring element and engaging another of said ratchet teeth to lock the brake controlling arm against movement relative to the measuring element in said opposite direction, said locking pawl being operative by said brake controlling arm to rock said measuring element out of engagement with said one stop into engagement with said other stop when the arm is rocked in said one direction, an extension on said driving pawl adapted to cooperate with the locking pawl to positively insure against accidental movement of the locking pawl out of locking engagement with the brake controlling arm, as the measuring element is moved between said stops in said one direction, said brake controlling arm and driving pawl being movable in said one direction relative to said measuring element and locking pawl when the measuring element is in engagement with said other stop and wear in the brake occurs, the driving pawl moving away from the locking pawl to permit the locking pawl to ratchet into locking engagement with a ratchet tooth which has been advanced by the arm, said driving pawl when subsequently moved in said opposite direction being adapted to ratchet into driving engagement with another of the ratchet teeth and into its normal cooperative relationship with said locking pawl.

2. In a combined brake lever and slack take-up mechanism, an arm rockable in one direction to actuate a brake rigging to effect an application of the brake and operative in the opposite direction to effect the release of the brake, a measuring element rockable by and with said arm in said one direction for a limited distance, said arm being movable in said one direction relative to the measuring element when the measuring element has been moved to its limit of travel, a locking pawl pivotally carried by said measuring element operative into locking engagement with said arm for locking the arm in its advanced position with relation to the measuring element, means including a driving pawl engaging said arm at a certain point and being operative to actuate said arm in said one direction, said driving pawl being movable in said opposite direction, subsequent to the movement of the arm relative to said measuring element, to engage the arm at a different point spaced from said certain point a distance equal to the distance the arm has been moved relative to the measuring element, an extension on said driving pawl for normally inhibiting accidental movement of said locking pawl out of locking engagement with said arm, said extension when the driving pawl is moved to actuate said arm relative to the measuring element being out of its inhibiting position and permitting the locking pawl to move out of locking engagement with one part of said arm and into locking engagement with another part of the arm.

3. In a combined brake lever and slack take-up mechanism, an arm rockable in one direction to actuate a brake rigging to effect an application of the brake and operative in the opposite direction to effect the release of the brake, a measuring element rockable by and with said arm in said one direction for a limited distance, said arm being movable in said one direction relative to the measuring element when the measuring element has been moved to its limit of travel, a locking pawl pivotally carried by said measuring element operative into locking engagement with said arm for locking the arm in its advanced position with relation to the measuring element, means including a driving pawl engaging said arm at a certain point and being operative to actuate said arm in said one direction, said driving pawl being movable in said opposite direction, subsequent to the movement of the arm relative to said measuring element, to engage the arm at a different point spaced from said certain point a distance equal to the distance the arm has been moved relative to the measuring element, an extension on said driving pawl for normally inhibiting accidental movement of said locking pawl out of locking engagement with said arm, said extension when the driving pawl is moved to actuate said arm relative to the measuring element being out of its inhibiting position and permitting the locking pawl to move out of locking engagement with one part of said arm and into locking engagement with another part of the arm, and a spring for at all times yieldably holding both of said pawls in engagement with said arm.

4. In a combined brake lever and slack take-up mechanism, an arm rockable in one direction to actuate a brake rigging to effect an application of the brake and operative in the opposite direction to effect the release of the brake, a measuring element rockable by and with said arm in said one direction for a limited distance, said arm being movable in said one direction relative to the measuring element when the measuring element has been moved to its limit of travel, a locking pawl pivotally carried by said measuring element operative into locking engagement with said arm for locking the arm in its advanced position with relation to the measuring element, means including a driving pawl engaging said arm at a certain point and being operative to actuate said arm in said one direction, said driving pawl being movable in said opposite direction, subsequent to the movement of the arm relative to said measuring element, to engage the arm at a different point spaced from said certain point a distance equal to the distance the arm has been moved relative to the measuring element, an extension on said driving pawl for normally inhibiting accidental movement of said locking pawl out of locking engagement with said arm, said extension when the driving pawl is moved to actuate said arm relative to the measuring element being out of its inhibiting position and permitting the locking pawl to move out of locking engagement with one part of said arm and into locking engagement with another part of the arm, and a spring for at all times yieldably holding both of said pawls in engagement with said arm, an open ended slot in the end of said extension, and a slot in said locking pawl open at one end to the open end of the slot in said extension, said slots being arranged to accommodate a tool which may be rotated to move both of said pawls out of engagement with said arm.

5. In a combined brake lever and slack take-up mechanism, a driven brake controlling arm having a toothed portion and rockable in one direction to actuate a brake rigging to effect an application of the brake and in the opposite direction to effect a release of the brake, driving means for actuating said arm in said one direction including a driving pawl pivotally mounted on said means for operatively connecting said means with the toothed portion of said arm, a measuring element rockable a limited distance with said arm, a locking pawl pivotally mounted on said element for locking engagement with the toothed portion for the limited movement therewith, and a single spring mounted between the two pawls so as to urge each pawl into operative engagement with said toothed portion, said locking pawl permitting movement of said arm relative to said element in said one direction to a position on said toothed portion advanced beyond the limited movement of said element and operative to lock said arm in the advanced position against relative movement in the opposite direction and said driving pawl permitting movement of said driving means relative to said arm in said opposite direction to a correspondingly advanced position.

6. In a combined brake lever and slack take-up mechanism, a driven brake controlling arm having a toothed portion and rockable in one direction to actuate a brake rigging to effect an application of the brake and in the opposite direction to effect a release of the brake, driving means for actuating said arm in said one direction including a driving pawl pivotally mounted on said means for operatively connecting said means with the toothed portion of said arm, a measuring element rockable a limited distance with said arm, a locking pawl pivotally mounted on said element for locking engagement with the toothed portion for the limited movement therewith, and a single spring mounted between the two pawls so as to urge each pawl into operative engagement with said toothed portion, said measuring element being effective to limit movement of said locking pawl with said arm in said one direction and to limit movement of said driving means with said arm in said opposite direction.

7. In a combined brake lever and slack take-up mechanism, a driven brake controlling arm having a toothed portion and rockable in one direction to actuate a brake rigging to effect an application of the brake and in the opposite direction to effect a release of the brake, driving means for actuating said arm in said one direction, a driving pawl pivotally mounted on said means for operatively connecting said means with the toothed portion of said arm, a pair of spaced oppositely disposed fixed stops, a measuring element rockable between said stops, a locking pawl pivotally mounted on said element for locking engagement with said toothed portion for limited movement therewith, a spring exerting a pressure on each of the pawls in a direction for urging said pawls into operative engagement with said toothed portion, said measuring element when in engagement with the one stop limiting movement of said locking pawl with said arm in said one direction and when in engagement with the other stop limiting movement of said driving means with said arm in said opposite direction.

CECIL S. KELLEY.

REFERENCES CITED

The following references are of record in the file of this patent:

FOREIGN PATENTS

| Number | Country | Date |
|---|---|---|
| 271,926 | Great Britain | May 30, 1927 |